Nov. 25, 1941.　　　　F. C. ISELY　　　　2,263,582
STAR CHART
Filed Sept. 5, 1940
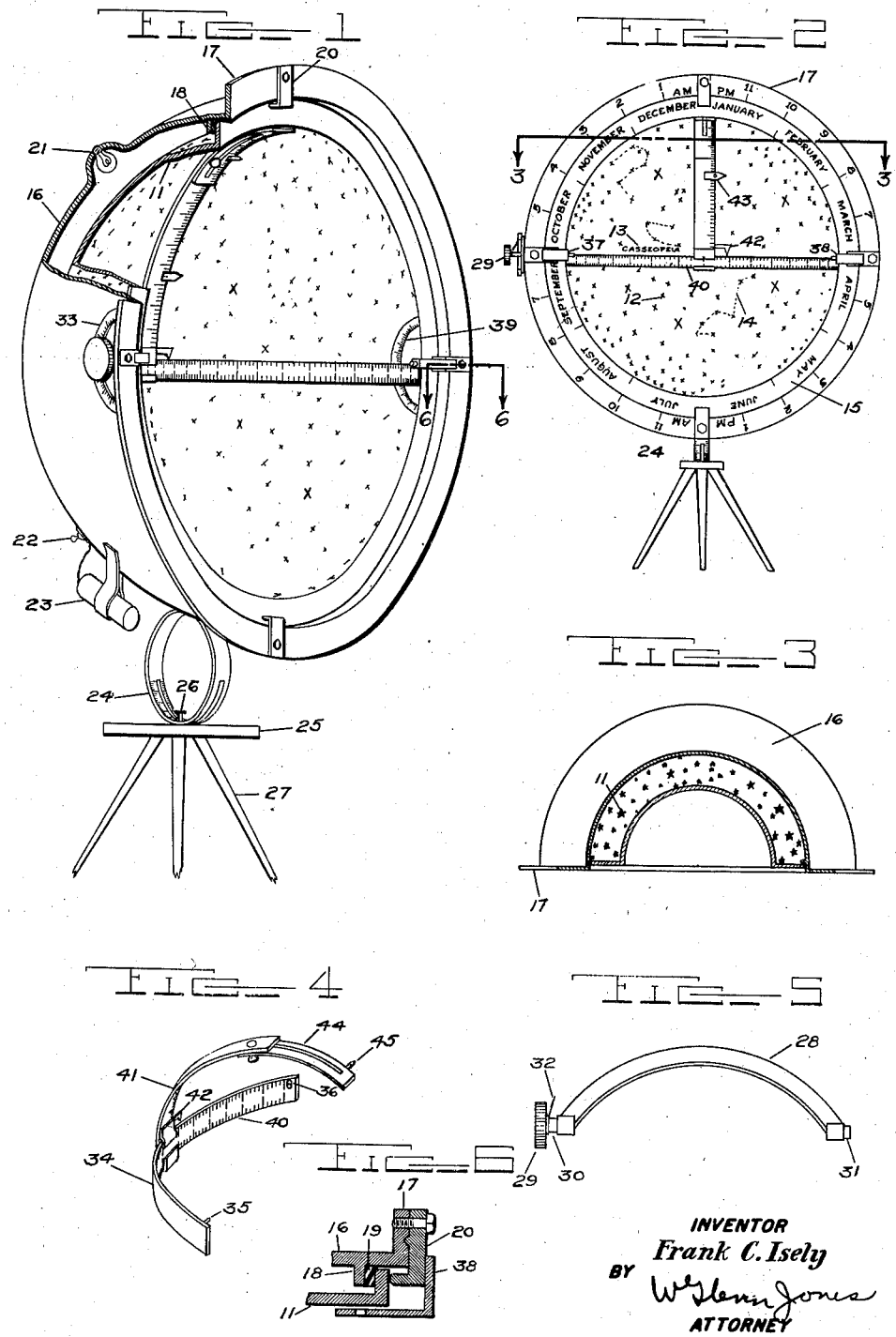
INVENTOR
Frank C. Isely
BY
ATTORNEY Patented Nov. 25, 1941

2,263,582

UNITED STATES PATENT OFFICE 2,263,582

STAR CHART

Frank C. Isely, Washington, D. C.

Application September 5, 1940, Serial No. 355,487

10 Claims. (Cl. 35—44)

(Granted under the act of March 3, 1883, as amended April 30, 1928; 370 O. G. 757)

My invention relates generally to star charts, and particularly to hemispherical star charts in which the observer looks within the hemisphere at a concave surface.

One of the objects of my invention is to provide an improved means of assisting in the instruction of students of astronomy, navigation, and related subjects. The student has difficulty in attempting to identify the stars and constellations he sees in the heavens when he uses a chart on a surface which is flat rather than curved. A further difficulty with the previous flat star charts is that they ordinarily can not be set up readily so that they can be viewed almost simultaneously with the stars overhead. A still further difficulty with the previous flat star charts arises due to the fact that when the student has sufficient illumination to see the chart he can not look from chart to heavens without waiting for his eyes to become adjusted to the change in intensity of the light.

Previous charts on curved surfaces have also been developed. Those on the outer surfaces of globes, hemispheres, etc., cause difficulty to the student because, due to their being on a convex surface, they are vastly different in appearance from the heavens where the stars appear to be on a concave surface. Previous star charts on concave surfaces are of two types. Some are placed on opaque surfaces and possess the same objection as flat charts in regard to the inability of the student to look directly from the chart to the heavens without waiting for his eyes to become adjusted after having accustomed themselves to the amount of light necessary to see the chart. In other charts on concave surfaces the student enters within the concave surface, which is then sealed with a light-excluding closure. The general light of the room or space in which the device is placed enters through small apertures which represent the stars. Thus this type can not be set up so as to permit an approach to simultaneous observation of stars and chart.

Another object of my invention is to provide a convenient means of identification of the stars and constellations for the casual observer or member of the general public, as well as the serious student. The success of the several costly planetariums in operation at the present time demonstrates that there is much interest in the names and locations of the stars and constellations. My inexpensive invention can be set up in locations as city parks, amusement parks, resort beach piers, country estates and upper decks of passenger vessels, with or without an attendant, and will provide the non-scientific, casual observer with a ready means of increasing his information on the subject of the stars and constellations by looking directly from the actual heavenly body to the chart which shows a miniature representation of the sky with the minimum of artificiality.

Another object of my invention is to assist those engaged in the practice of celo-navigation. The navigator frequently desires to ascertain before twilight which stars will be visible, will have sufficient altitude to avoid excessive refractive error, and will be located in respect to azimuth so as to give lines of position at large angles. Also the navigator must identify each star of which he has obtained observations. Frequently this is difficult because of partial cloudiness which renders it impossible to identify the star through its location with respect to other stars. With my invention, particularly when the azimuth and altitude attachment is used, the determination of the which stars will be suitable for observation, and the identity of the stars which have been observed, can be made with convenience, dispatch, and, because of the simulation of the actual appearance of the heavens with the minimum possibility of error.

I attain the above objects by placing my chart on two readily interchangeable hemispherical shells or surfaces, one surface for the northern sky and one for the southern. The chart in use is internally illuminated in such a way that the stars, the outlines of the constellations, and the names of both, appear as and are marked out by small points of light without undue brightness, so the eye can look at the chart and then at the heavens without readjustment. Also, this chart can be set up on a tripod or other support so that one may almost simultaneously see both the chart and the stars above.

My invention will be described in connection with the following drawing, in which Fig. 1 is a half-side, half-front view of my invention, partly in section, showing the manner of assembly and certain details of construction;

Fig. 2 is a view looking toward the front of my invention directly into the inner surface of the inner hemispherical shell;

Fig. 3 is a sectional view through line 3—3 of Fig. 2;

Fig. 4 is a detailed view of the removable azimuth and altitude attachment of my invention;

Fig. 5 is a detail view of the adjustable horizon baffle of my device; and

Fig. 6 is a sectional view through line 6—6 of Fig. 1, showing the manner of clamping the inner hemisphere in place.

Referring to the drawing, my device utilizes two interchangeable inner shells 11, hemispherical or nearly so in shape, of either opaque or transparent material. If opaque material is used, the stars 12 and the names 13 (Fig. 2) of the stars and constellations are punched out. If desired, the outlines 14 (Fig. 2) of the constellations may also be punched out. Those located in the northern celestial hemisphere are on one shell 11, while those located in the southern celestial hemisphere are on the other. The size of the aperture which is punched out is indicative of the magnitude of the star. If the shell is to be made of transparent material the stars, constellations, names and outlines will be indicated by clear spots similar to the punchings in the case of the opaque shell, and the remaining portions of the shell, or background, darkened so as to appear relatively opaque.

At its base, the hemispherical surface of each inner shell 11 is extended a short distance to form a cylindrical surface, this cylindrical surface terminating in a flat rim 15. Portions of great circles representing right ascension, and small circles representing declination, may be marked on the chart, the representations of the stars will be so placed that their right ascensions and declinations, as indicated by the aforesaid great circles and small circles, will be correct for these values as given in the Nautical Almanac on the date of orientation. It is true that these values change throughout the passage of time, but, as the changes are extremely small, on the order of one minute of arc throughout a year, they may be neglected for the purposes of this device.

An outer shell 16 of opaque material is also provided. This shell is generally hemispherical in shape, is larger than the inner shell so that it will fit over the inner shell and leave a space between the two, and has a corresponding cylindrical extension. Outer shell 16 likewise terminates in a flat rim 17 and has an integral annular shoulder 18 (Fig. 1) against which inner shell 11 rests, being separated therefrom by soft, opaque packing 19. Removable clamps 20, bolted to rim 17, hold inner shell 11 in place, but in such manner as to permit ready rotation of inner shell 11 within outer shell 16. Inner shells 11 are readily interchanged by the removal of clamps 20.

While inner shell 11 is shown mounted in an outer hemispherical shell 16, such being the preferred arrangement, it is obvious that outer shell 16 may be supplanted by an enclosure of a different shape having a circular opening therein, in which each inner shell 11 may be rotatably supported.

In the space between the outer shell 16 and the inner shell 11 is mounted an electric bulb 21 on a great circle bisecting the outer shell 16 at a point 15 degrees of arc from the base of the hemispherical portion. This bulb 21 is of such brightness that the chart when observed under the open skies at night has very nearly the same degree of brightness as the heavens. The bottom of the bulb 21 is covered with an opaque screen or paint so that direct rays can not be observed even if an aperture is directly under the bulb, and undue brightness of a particular star representation is thus prevented.

The outer shell 16 has a polished inner surface, and the inner shell 11 a polished outer surface, so that the reflected light from the bulb 21 will be caused to illuminate the space between the shells, and shine through the apertures, thus giving the appearance of stars and making legible the names of the stars and the constellations and the outlines of the constellations. Also mounted on the outer shell are switch 22 and battery 23 which are connected by suitable wiring to the electric bulb 21.

Outer shell 16 is supported by latitude scale 24, annular in shape and graduated through 180 degrees or less of arc, as may be desirable. There is a central longitudinal slot in the graduated portion of scale 24 in which clamping screw 26 fits so as to firmly clamp latitude scale 24 to mount 25 in any desired position along the graduated portion of the scale.

Mount 25 is secured to the tripod or other suitable stand 27 either rigidly, or with a swivel connection to facilitate turning the chart without moving the tripod or stand.

Latitude scale 24 is sufficiently strong to support the weight of the entire chart. The graduations commence at the center of the scale, in the plane of the base of the hemispherical surfaces of the inner shell 11 and the outer shell 16. The graduations run in both directions from the center of the scale to 90 degrees, or as near that as may be desired. That which runs in a direction towards the base of the chart is marked to indicate that it is to be used when the latitude of the observer is of the same name as that of the inner shell or chart in use, and that which runs in the opposite direction from the base of the chart is marked to indicate it is to be used when the latitude of the observer is of different name than that of the inner shell or chart in use. Scale 26 is placed on shell 16 so that the longitudinal center line of the slot in scale 26 lies in the plane bisecting the shells 11 and 16 and passing through the bulb 21, but at the opposite side of the dome of the shell from the bulb 21.

On the rim 17 are marked the hours of the day, arranged counter-clockwise either in two series of 12, as is the civil practice in this country, or in one series of 24, as is the practice by many mariners and in European countries. One of the figures 12 or the figure 24 is placed on the rim 17 so that when the device is assembled it will lie in the plane of the great circle bisecting the shell 16 and passing through the bulb 21, on the same side of this great circle, which represents the meridian of the observer, as the bulb 21. This figure is the key figure for orientation of the star representations. If two series of 12 are used the series starting at the key figure is marked to indicate that it is used after midnight, and the other series is marked to indicate that it is used before midnight.

In order to represent the effect of the horizon, a baffle 28 is placed between the shells, the position of such baffle being adjustable. This baffle is rectangular in cross-section and is of such shape and of such dimensions that it may be moved freely in the space between shells 11 and 16. From the ends of the baffle short shafts 30 and 31 project outwardly, the axes of such shafts lying in the same line and also in the plane of one of the flat surfaces of the baffle. Two surfaces of the baffle are covered with soft opaque material which block the passage of light but which do not interfere with the easy rotation of the baffle about the axes of shafts 30 and 31.

The flat surface of the baffle 28 which lies in the plane of the axes of the shafts 30 and 31 is the portion which represents the horizon. In order that this surface may perform this function when the observer is on or near the Equator, since the plane of the bases of the hemispherical portions of the shells 11 and 16 represents the plane of the celestial equator, these bases have been extended by cylindrical surfaces, as described above. Thus the baffle 28 may lie in this space, on the side of the dome of the outer shell 16 away from the bulb 21. It may be adjusted to represent the horizon at any latitude less than approximately 75 degrees, north or south. At latitudes above these, where the use of the chart would be very infrequent, the presence of the bulb 21 interferes in the present design.

The outer ends of the shafts 30 and 31 pass through the shell 16 at the points on the plane of the base of the hemispherical portions of the shell 16, which are 90 degrees from the plane of the great circle bisecting the shell 16 and passing through the bulb, which points therefore represent the east and west points of the horizon. The outer end of shaft 31 terminates after passing through its bearing in shell 16.

Shaft 30 is supported in another bearing in shell 16 and its outer end terminates in a threaded portion on which is screwed knob 29 which is used to turn the baffle 28. Pointer 32 is held on this shaft by knob 29. A clamping screw (not shown) passes through the outer hub of one bearing in shell 16 to secure the baffle at any desired position. In the smaller sizes of charts this clamping screw may be omitted, the fit of the bearings in shell 16 and the covering of the baffle 19 providing sufficient friction to hold the baffle in any desired position, at the same time permitting rotation.

Secured to the outer surface of shell 16, with the center of shaft 30 as a center, is arc-shaped horizon scale 33, graduated in degrees of latitude to 75 degrees in each direction from a central 0 degrees mark. The graduations which run in a counter-clockwise direction are marked to indicate that such portion of the scale is to be used when the latitude of the observer is of the same name as the latitude of the inner shell or chart in use; those which run in a clockwise direction are marked to indicate use when the latitude of the observer is of opposite name than the inner shell or chart 11 in use. Scale 33 is disposed adjacent to pointer 32.

The months and days are marked on the rim 15 of the inner shells in a clockwise direction from January 1 to December 31. Their location with respect to the apertures representing stars is determined by obtaining for one particular star, on any particular date and for any particular longitude that may be selected, the local civil time of transit of that particular star of the upper branch of the meridian. The month and day markings are then so placed that, when the representation of the particular star is turned so as to be in its closest position in the vertical plane of the great circle bisecting the shells and passing through the bulb 31, thence appearing to transit the upper branch of the meridian, the month and day as marked on the rim 15 of the inner shell is opposite the local civil time of transit as marked on the rim 17. If two series of 12 hours each are used care must be taken that the correct series is used, remembering that the second series counter-clockwise from the key figure corresponds to the series 13 to 24 of the numbering of the hours used in designating local civil time. Thus on the day and hour and at the longitude for which oriented my miniature heavens will shown an exact reproduction of the appearance of the actual sky.

If, in the operation of the device, the date is set opposite the zone time rather than the local civil time, the error introduced will in general be of no consequence, as the appearance of the sky changes very slightly in the interval corresponding to the difference. If the device is to be used habitually in one locality, the difference between zone time and local civil time can be incorporated in the orientation.

Differences of local civil time due to change of longitude from the longitude of orientation, like differences in the position of the stars due to change of right ascension and declination, are so slight that the errors caused thereby may be neglected.

In operation, the chart, after being mounted on a tripod or other suitable support such that mount 25 rests in a horizontal plane, is oriented so that the dome of the hemispherical shell in use, which represents the pole of that portion of the celestial sphere, is turned directly north if the northern hemisphere is in use, or south if the southern hemisphere is in use. The dome of the chart is caused to point directly at the corresponding celestial pole by rotating the chart until a pointer (not shown) marked on the upper surface of mount 25 lies opposite the marking on the latitude scale 24 corresponding to the latitude of the observer, on the side of the scale corresponding to the inner shell or chart 11 in use.

In order to represent the effect of the horizon the observer must turn the horizon baffle knob 29 so the pointer 32 lies opposite the marking on the horizon scale 33 corresponding to his latitude on the side of the scale corresponding to the inner shell or chart 11 in use. The inner shell 11 is then rotated until the day of the month on which the observation is taken, indicated on rim 15, is placed opposite the time of the observation as marked on rim 17.

When the internal illumination is turned on by closing switch 22, the chart shows the stars and constellations, and the outlines of the latter, with names for both, which lie in the hemisphere in use and which are visible above the horizon, in their relative positions and directions.

To view the heavenly bodies of the other hemisphere, it is only necessary to remove clamps 20, remove the inner shell 11 in use, replace it with the other inner shell and again set up on the clamps. The dome is then turned through 180 degrees to lie in the direction of the opposite pole, and the latitude and horizon settings are made as before.

The moon and planets may be represented on the chart by means of small discs coated with a phosphorescent material such as radium paint, and temporarily secured to the chart by means of small suction cups or other fasteners. If lines of right ascension and declination have been placed on the chart, these discs may be readily placed in their proper positions in accordance with the date of observation, by reference to the Nautical Almanac or similar publication, where these values are tabulated. Their change throughout the year is much too great to permit the moon and planets being represented by apertures as is done with the stars.

The time of rising or setting of particular heavenly bodies may be closely determined if the observer causes their appearance above or disappearance below the horizon by rotating the inner shell 11 and noting the time which is indicated on rim 17 corresponding to the day and month of the observation as marked on rim 15.

If the device is set up where a view of the heavens can be obtained, the observer can refer from heavens to chart and vice versa, reading the names of the stars and constellations and noting their outlines readily, without delay due to adjustment of his eye to different intensities of light, as chart and heavens are at very nearly the same degree of brightness.

The size of the device may be large or small, and there may be provided an eyepiece (not shown) containing a magnifying lens or system of lenses to assist the observer.

An azimuth and altitude attachment 34 is provided for the use of those engaged in the practice of celo-navigation, in order to furnish a means of determining these coordinates for known stars, and for identifying unknown heavenly bodies by means of these coordinates.

This azimuth and altitude attachment 34 (Fig. 4) comprises a semi-circular azimuth scale 40 and an arc-shaped altitude arm 41 which extends perpendicularly from the azimuth scale. Altitude arm 41 is slidably secured (Fig. 4) to the azimuth scale in such manner that it may slide longitudinally along the azimuth scale. From the ends of the azimuth scale project inwardly short shafts 35 and 36 which are supported in holders 37, 38 (Figs. 2, 6), spot-welded or otherwise secured to two of clamps 20 which are disposed on opposite sides of shell 16. Holders 38 are made of spring metal and are sprung inward to permit the insertion or removal of shafts 35 and 36 which are supported in bearings drilled or punched in holders 38. This attachment 34, when in place, fits snugly against the inner surface of inner shell 11 and is held by friction in any desired position. However, the attachment may be rotated by hand about the axes of shafts 35 and 36 and the altitude arm 41 is longitudinally slidable by hand along azimuth scale 40. When the attachment is in place, the axes of shafts 35 and 36 lie in the same straight line which is also the center line of shafts 30 and 31, and also lie in the plane of the upper flat surface of the azimuth scale 40.

Azimuth scale 40 is graduated in degrees 0 to 90 on each side of a central zero mark. Altitude arm 41 is graduated in degrees of altitude from 0 to 90, the 0 degree mark being in line with the upper plane surface of the azimuth scale. A pointer 42 indicates the longitudinal position of the altitude arm along the azimuth scale. The altitude arm is provided with a slidable index 43. A graduated altitude extension arm 44 of the same radius of curvature as the altitude arm is also provided for use under certain conditions. This extension arm is longitudinally slotted and is attached to altitude arm 41 at the free end of the latter in such manner that it may slide longitudinally along altitude arm 41. This extension is graduated in degrees of altitude from 0 to 90 degrees, the 0 degree mark appearing at its extended end. Pointer 45 is rigidly secured opposite such 0 degree mark. As extension arm 44 slides longitudinally along arm 41, the tip of pointer 45 remains in the same great circle as the tip of pointer 42 and index 43.

A semi-circular scale 39 (Fig. 1) graduated in degrees of latitude from 0 to 90 on each side of a central zero mark is inscribed on the inner surface of each shell 11 near rim 15. This scale is so disposed that its central zero mark lies in the same plane as the axes of shafts 35 and 36, and also in the plane that bisects the inner shell.

In order to use the altitude and azimuth attachment to identify a star of which the altitude and azimuth have been determined by observation, the navigator carries out the following procedure. If the bearing of the star is within 90 degrees, east or west, of that of the observer's elevated pole, the inner shell or chart 11 having the same name as the observer's latitude is used, and the altitude and azimuth attachment placed within the shell 11 where it is supported in holders 38. Azimuth scale 40 is turned about the axis of the shafts 35 and 36 until the upper edge of this scale indicates the latitude of the observer on the scale 39. As the azimuth scale 40 will be horizontal when in proper position, it will be obvious which side of the scale 39 to use. The altitude arm 41 is then moved along the azimuth scale 40 until pointer 42 indicates the observed azimuth of the star. The star will then appear opposite index 43 set to the altitude of the star.

If the bearing of the star is greater than 90 degrees, east or west, from that of the elevated pole of the observer, and the altitude as observed is more than the colatitude (90 degrees less the latitude) of the observer, we have a star of declination of the same name as the elevated pole of the observer, but less than his latitude. In this case the procedure is as before, except that pointer 42 is set to the observed azimuth plus 180 degrees, and the altitude extension arm 44 is slidably moved until the observed altitude is indicated on the extension arm 44 opposite the 90 degree mark on altitude arm 41, which 90 degree mark represents the zenith. The representation of the observed star will then appear opposite pointer 45 at the extended end of the arm 44.

If the bearing of the star is more than 90 degrees, east or west, from that of the elevated pole of the observer, and the observed altitude is less than the colatitude of the observer, the inner shell or chart 11 of different name than the latitude of the observer is used. Pointer 42 is set to the observed azimuth and the representation of the star is found opposite index 43 set at the proper graduation on arm 41.

In order to use the altitude and azimuth attachment to determine which stars will be suitable for later observations, by reason of having sufficient altitudes to avoid excessive refractive error and azimuths so related that the lines of position from the observations will intersect at suitable angles, the navigator carries out the following procedure: The device is set up with each of the inner shells or charts 11 in turn, and adjusted for the expected time of observation. Suitable stars are selected, and their altitudes and azimuths noted by placing pointer 45 or index 43, as the case may be, adjacent to such stars. If extension arm 44 is used, 180 degrees must be added to the azimuth indicated on the azimuth scale 40 opposite pointer 42. The navigator is then prepared to watch for appearance of the selected stars in the predetermined directions and at the predetermined heights above the horizon, and can expeditiously obtain his observation in the short interval of twilight.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

I claim:

1. In an astronomical apparatus having two opaque interchangeable hemispherical shells, one representing the heavens of the northern and the other of the southern celestial hemisphere, the combination including one such hemispherical shell, apertures in said shell representing the major stars of said celestial hemisphere and the names thereof, a second larger opaque hemispherical shell, means for rotatably supporting said first shell within said second shell, means to support said second shell, and means to illuminate the convex surface of said first shell with an intensity sufficient to make visible said apertures but insufficient to necessitate readjustment of the human eye when looking from said apertures to the starlit sky, whereby the astronomical apparatus when in a darkened space such as out of doors after nightfall will simulate the appearance of the heavens.

2. In an astronomical apparatus having two opaque interchangeable hemispherical shells, on representing the heavens of the northern and the other of the southern celestial hemisphere, the combination including one such hemispherical shell, apertures in said shell representing the major stars of said celestial hemisphere and the names thereof, a second larger opaque hemispherical shell, means for rotatably supporting said first shell within said second shell, means to support said second shell, means to illuminate the convex surface of said first shell with an intensity sufficient to make visible said apertures but insufficient to necessitate readjustment of the human eye when looking from said apertures to the starlit sky, and means to determine the approximate azimuth and altitude of any star represented upon said illuminated surface, whereby the astronomical apparatus when in a darkened space such as out of doors after nightfall will simulate the appearance of the heavens.

3. In an astronomical apparatus having two opaque interchangeable hemispherical shells, one representing the heavens of the northern and the other of the southern celestial hemisphere, the combination including one such hemispherical shell, apertures in said shell representing the major stars of said celestial hemisphere and the names thereof, a second larger opaque hemispherical shell, means for rotatably supporting said first shell within said second shell, means to support said second shell, means to illuminate a portion of the convex surface of said first shell with an intensity sufficient to make visible said apertures of said portion, but insufficient to necessitate readjustment of the human eye when looking from said apertures to the starlit sky, and means for selecting said illuminated portion to represent the heavens of the depicted hemisphere visible to an observer at any time regardless of his geographical location, whereby the astronomical apparatus when in a darkened space such as out of doors after nightfall will simulate the appearance of the heavens.

4. In an astronomical apparatus having two opaque interchangeable hemispherical shells, one representing the heavens of the northern and the other of the southern celestial hemisphere, the combination including one such hemispherical shell, apertures in said shell representing the major stars of said celestial hemisphere and the names thereof, a second larger opaque hemispherical shell, means for rotatably supporting said first shell within said second shell, means to support said second shell, means to illuminate a portion of the convex surface of said first shell with an intensity sufficient to make visible said apertures of said portion, but insufficient to necessitate readjustment of the human eye when looking from said apertures to the starlit sky, means for selecting said illuminated portion to represent the heavens of the depicted hemisphere visible to an observer at any time regardless of his geographical location, and means to determine the approximate azimuth and altitude of any star represented upon said illuminated portion as selected by said last mentioned means, whereby the astronomical apparatus when in a darkened space such as out of doors after nightfall will simulate the appearance of the heavens.

5. In an astronomical apparatus having two opaque interchangeable hemispherical shells, one representing the heavens of the northern and the other of the southern celestial hemisphere, the combination including one such hemispherical shell, apertures in said shell representing the major stars of said celestial hemisphere and the names thereof, a rim at the base of said first shell, a scale on said rim graduated in days and months of the year, a second larger opaque hemispherical shell, a rim at the base of said second shell, a scale on said last mentioned rim graduated in hours of the day, means for rotatably supporting said first shell within said second shell so that said day scale cooperates with said hour scale, a mount, adjustable means to support said second shell upon said mount at any angle, a scale graduated in degrees of latitude to indicate said angle, and means to illuminate the convex surface of said first shell with an intensity sufficient to make visible said apertures but insufficient to necessitate readjustment of the human eye when looking from said apertures to the starlit sky, whereby the astronomical apparatus when in a darkened space such as out of doors after nightfall will simulate the appearance of the heavens.

6. In an astronomical apparatus having two opaque interchangeable hemispherical shells, one representing the heavens of the northern and the other of the southern celestial hemisphere, the combination including one such hemispherical shell, apertures in said shell representing the major stars of said celestial hemisphere and the names thereof, a rim at the base of said first shell, a scale on said rim graduated in days and months of the year, a second larger opaque hemispherical shell, a rim at the base of said second shell, a scale on said last mentioned rim graduated in hours of the day, means for rotatably supporting said first shell within said second shell so that said day scale cooperates with said hour scale, a mount, adjustable means to support said second shell upon said mount at any angle, a scale graduated in degrees of latitude to indicate said angle, means to illuminate the convex surface of said first shell with an intensity sufficient to make visible said apertures but insufficient to necessitate readjustment of the human eye when looking from said apertures to the starlit sky, and means to determine the approximate azimuth and altitude of any star represented upon said illuminated surface, whereby the astronomical apparatus when in a darkened space such as out of doors after nightfall will simulate the appearance of the heavens.

7. In an astronomical apparatus having two opaque interchangeable hemispherical shells, one representing the heavens of the northern and the other of the southern celestial hemisphere, the combination including one such hemispherical shell, apertures in said shell representing the major stars of said celestial hemisphere and the names thereof, a rim at the base of said first shell, a scale on said rim graduated in days and months of the year, a second larger opaque hemispherical shell, a rim at the base of said second shell, a scale on said last mentioned rim graduated in hours of the day, means for rotatably supporting said first shell within said second shell so that said day scale cooperates with said hour scale, a mount, adjustable means to support said second shell upon said mount at any angle, a scale graduated in degrees of latitude to indicate such angle, means to illuminate a portion of the convex surface of said first shell with an intensity sufficient to make visible said apertures of said portion, but insufficient to necessitate readjustment of the human eye when looking from said apertures to the starlit sky, a second scale graduated in degrees of latitude, a baffle adjustable in cooperation with said second scale to limit said illuminated portion to that which represents the heavens of the depicted hemisphere visible to an observer at the time and place indicated by said hour scale, said day scale and said second latitude scale, and means to determine the approximate azimuth and altitude of any star represented upon said illuminated portion as selected by said baffle, whereby the astronomical apparatus when in a darkened space such as out of doors after nightfall will simulate the appearance of the heavens.

8. In an astronomical apparatus having two opaque interchangeable hemispherical shells, upon one of which the stars and their names of the northen, and upon the other of which the stars and their names of the southern celestial hemisphere are represented by apertures, the combination including one such hemispherical shell, a second larger opaque hemispherical shell, means for rotatably supporting said first shell within said second shell, means to support said second shell, and means to illuminate the convex surface of said first shell with an intensity sufficient to make visible said apertures but insufficient to necessitate readjustment of the human eye when looking from said apertures to the starlit sky, whereby the astronomical apparatus when in a darkened space such as out of doors after nightfall will simulate the appearance of the heavens.

9. In an astronomical apparatus having two opaque interchangeable hemispherical shells, upon one of which the stars and their names of the northern, and upon the other of which the stars and their names of the southern celestial hemisphere are represented by small translucent areas, the combination including one such hemispherical shell, a second larger opaque hemispherical shell, means for rotatably supporting said first shell within said second shell, means to support said second shell, and means to illuminate the convex surface of said first shell with an intensity sufficient to make visible said apertures but insufficient to necessitate readjustment of the human eye when looking from said apertures to the starlit sky, whereby the astronomical apparatus when in a darkened space such as out of doors after nightfall will simulate the appearance of the heavens.

10. In an astronomical apparatus having two opaque interchangeable hemispherical shells, one representing the heavens of the northern and the other of the southern celestial hemisphere, the combination including one such hemispherical shell, small translucent areas in said shell representing the major stars of said celestial hemisphere and the names thereof, a rim at the base of said first shell, a scale on said rim graduated in days and months of the year, a second larger opaque hemispherical shell, a rim at the base of said second shell, a scale on said last mentioned rim graduated in hours of the day, means for rotatably supporting said first shell within said second shell so that said day scale cooperates with said hour scale, a mount, adjustable means to support said second shell upon said mount at any angle, a scale graduated in degrees of latitude to indicate said angle, means to illuminate a portion of the convex surface of said first shell with an intensity sufficient to make visible said translucent areas of said portion, but insufficient to necessitate readjustment of the human eye when looking from said translucent areas to the starlit sky, a second scale graduated in degrees of latitude, a baffle adjustable in cooperation with said second scale to limit said illuminated portion to that which represents the heavens of the depicted hemisphere visible to an observer at the time and place indicated by said hour scale, said day scale and said second latitude scale, and means to determine the approximate azimuth and altitude of any star represented upon said illuminated portion as selected by said baffle, whereby the astronomical apparatus when in a darkened space such as out of doors after nightfall will simulate the appearance of the heavens.

FRANK C. ISELY.